(12) United States Patent
Olex et al.

(10) Patent No.: US 7,934,421 B2
(45) Date of Patent: May 3, 2011

(54) BIAXIAL WHEEL TEST ASSEMBLY

(75) Inventors: Timothy Olex, Livonia, MI (US); David Zander, Webberville, MI (US); Christian R. Ritchey, Milan, MI (US); Martin R. Scherzer, Howell, MI (US); David Friske, Royal Oak, MI (US); Lee Davis, Livonia, MI (US); Carlos Agudelo, Superior Township, MI (US)

(73) Assignee: Link Engineering Company, Plymouth, MI (US)

( * ) Notice: Subject to any disclaimer, the term of this patent is extended or adjusted under 35 U.S.C. 154(b) by 97 days.

(21) Appl. No.: 12/462,631

(22) Filed: Aug. 5, 2009

(65) Prior Publication Data

US 2010/0031740 A1  Feb. 11, 2010

Related U.S. Application Data

(60) Provisional application No. 61/137,993, filed on Aug. 5, 2008.

(51) Int. Cl.
  *G01M 17/02* (2006.01)
(52) U.S. Cl. .......................................................... 73/146
(58) Field of Classification Search .................... None
  See application file for complete search history.

(56) References Cited

U.S. PATENT DOCUMENTS

| | | | |
|---|---|---|---|
| 3,867,838 A | 2/1975 | Gerresheim | |
| 3,937,076 A * | 2/1976 | Pommellet et al. | 73/146 |
| 4,047,338 A | 9/1977 | Gormish et al. | |
| 4,171,641 A | 10/1979 | Landsness | |
| 4,197,736 A | 4/1980 | Barrett | |
| 4,475,383 A | 10/1984 | Fischer et al. | |
| 4,489,598 A | 12/1984 | Beebe et al. | |
| 4,499,759 A | 2/1985 | Hull | |
| 4,748,844 A | 6/1988 | Yoshikawa et al. | |
| 4,821,582 A | 4/1989 | Meyer et al. | |
| 4,964,299 A | 10/1990 | Maier et al. | |
| 5,241,856 A | 9/1993 | Petersen et al. | |
| 5,259,246 A | 11/1993 | Stuyts | |
| 5,481,907 A * | 1/1996 | Chasco et al. | 73/146 |
| 5,610,330 A | 3/1997 | Fricke et al. | |
| 5,777,219 A * | 7/1998 | Popio et al. | 73/146 |
| 5,789,668 A | 8/1998 | Coe et al. | |
| 5,886,350 A | 3/1999 | Cook et al. | |
| 5,900,542 A | 5/1999 | Fricke et al. | |
| 6,006,597 A | 12/1999 | Miyazaki | |
| 6,032,520 A | 3/2000 | Miyazaki | |
| 6,324,919 B1 | 12/2001 | Larsen et al. | |

(Continued)

FOREIGN PATENT DOCUMENTS

JP  11173952 A * 7/1999

*Primary Examiner* — Andre J Allen
(74) *Attorney, Agent, or Firm* — Clark Hill PLC

(57) ABSTRACT

A wheel test assembly for testing a wheel-and-tire assembly includes a drum operatively mounted to a base for rotation of the drum. The drum includes an inner circumferential surface. A tailstock assembly is slidably coupled to the base for movement in a lateral direction relative to the drum. A support assembly is slidably coupled to the tailstock assembly for movement in a vertical direction for positioning the wheel-and-tire assembly into rolling contact with the inner circumferential surface of the drum. A spindle assembly is pivotally coupled to the support assembly to adjust a camber angle of the wheel-and-tire assembly. The wheel-and-tire assembly is mounted to the spindle assembly for rotation of the wheel-and-tire assembly.

21 Claims, 7 Drawing Sheets

U.S. PATENT DOCUMENTS

| | | |
|---|---|---|
| 6,382,020 B1 | 5/2002 | Fischer et al. |
| 6,575,024 B2 * | 6/2003 | Sinnett ............................ 73/146 |
| 6,655,202 B2 | 12/2003 | Potts et al. |
| 6,729,178 B2 | 5/2004 | Leska, Sr. et al. |
| 6,813,938 B2 | 11/2004 | Schwendemann |
| 7,140,242 B1 * | 11/2006 | Poling et al. .................... 73/146 |
| 7,254,995 B2 | 8/2007 | Leska, Sr. et al. |
| 2002/0011102 A1 | 1/2002 | Leska, Sr. et al. |
| 2002/0104366 A1 * | 8/2002 | Sinnett ............................ 73/1.01 |
| 2009/0012763 A1 * | 1/2009 | Langer et al. ..................... 703/8 |
| 2009/0301183 A1 * | 12/2009 | Jenniges et al. ................ 73/146 |
| 2010/0037714 A1 * | 2/2010 | Friske .......................... 73/865.9 |

* cited by examiner

BIAXIAL WHEEL TEST ASSEMBLY

CROSS-REFERENCE TO RELATED APPLICATION

This application claims priority to and all the benefits of U.S. Provisional Application No. 61/137,993, filed on Aug. 5, 2008 and entitled "Biaxial Wheel Test Assembly."

BACKGROUND OF THE INVENTION

1. Field of the Invention

The invention relates to a biaxial wheel test assembly for fatigue and durability testing of a wheel-and-tire assembly. More particularly, the invention relates to an improved biaxial wheel test assembly which measures actual loads experienced by a wheel-and-tire assembly and automatically controls a camber angle of the wheel-and-tire assembly in response to monitoring a camber moment during testing.

2. Description of Related Art

Biaxial wheel testing apparatuses are well known in the art for fatigue and durability testing of vehicle wheel components including wheel rims, wheel hubs, wheel bearings, wheel bolts, and/or other braking, steering, and suspension components. Such testing apparatuses subject passenger car and light truck wheels to simulated real-world road conditions by mounting a wheel-and-tire assembly to a spindle, disposing the wheel-and-tire assembly into a rotating drum, and subjecting the wheel-and-tire assembly to various predetermined loads. The wheel-and-tire assembly includes a tire mounted to a wheel rim. A portion of the tire, or tire contact patch, engages an inner circumferential surface of the rotating drum.

U.S. Pat. No. 4,475,383 issued to Fischer et al. discloses one example of a biaxial wheel testing apparatus which includes a loading device or frame for imposing selected vertical or radial input loads that are directed radially toward an axis of rotation of a wheel-and-tire assembly, and lateral or axial input loads that are directed parallel to the axis of rotation of the wheel-and-tire assembly. The radial input loads are imposed on the wheel-and-tire assembly by a first servo-controlled hydraulic cylinder acting upon the frame to force a tire of the wheel-and-tire assembly against an inner surface of a cylindrical drum. Similarly, the axial input loads are imposed on the wheel-and-tire assembly by a second servo-controlled hydraulic cylinder acting upon the frame to force the tire against an annular contact ring fixedly attached to the inner surface of the drum.

U.S. Pat. No. 7,254,995 issued to Leska, Sr. et al. discloses another example of a biaxial wheel testing apparatus which includes a support structure that supports a wheel-and-tire assembly in engagement with a rotating drum. A slide assembly, connected to a first hydraulic actuator, is provided for movement of the rotating drum substantially parallel to an axis of rotation of the rotating drum to apply lateral or axial input loads to the wheel-and-tire assembly. The wheel-and-tire assembly is mounted to a spindle which, in turn, is movably supported by a plurality of struts operatively connected to a base. A first strut is operatively connected to a second hydraulic actuator for applying a radial input load through the first strut so as to simulate substantially vertical loads to the wheel-and-tire assembly. The radial input loads are measured by a first load cell disposed along the first strut. The axial input loads are reacted through a second strut connected between the spindle and the base. The axial input loads are measured by a second load cell disposed along the second strut. A pair of third struts support the spindle in a vertical direction and each third strut includes a third load cell disposed therealong for measuring drive torque and braking torque. A camber angle of the wheel-and-tire assembly can also be adjusted by rotating the base using a third hydraulic actuator.

One particular disadvantage of the biaxial wheel testing apparatus disclosed in Leska, Sr. et al. is the load cells are located remotely from the wheel-and-tire assembly and measure the input loads as opposed to the actual loads experienced by the wheel-and-tire assembly itself. Therefore, complex mathematical algorithms are necessary to estimate the actual loads experienced by the wheel-and-tire assembly. Another disadvantage is frictional and hysteresis losses occurring within the support structure between the load cells and the wheel-and-tire assembly that are difficult or impossible to account for. Such algorithms and losses can introduce errors in the test data and provide failure modes that are unrealistic relative to that observed during real-world vehicle testing or provide erroneous or non-repetitive wheel damage.

Additionally, the above-described biaxial wheel testing apparatuses are relatively large and bulky in order to provide the necessary movement of the wheel-and-tire assembly. Further, hydraulic systems used to load the wheel-and-tire assembly against the rotating drum have inherent disadvantages in that supply and return lines must be routed for each hydraulic actuator. With multiple hydraulic line connections, leaks are unavoidable.

In use, the above-described biaxial wheel testing apparatuses test wheel-and-tire assemblies using sets of lateral and radial input loads determined during vehicle testing. Each set of lateral and radial input loads is referred to as a load pair. For each load pair, an optimum tilt or camber angle is determined via correlation to vehicle testing or one-time measurements on other test machines. Once the optimum camber angle is established for a given load pair, this angle is fixed and is used for any subsequent testing using the biaxial wheel testing apparatus. Thus, when a particular wheel-and-tire assembly is subjected to a particular load pair during testing, the predetermined optimum camber angle is selected and fixed until the desired number of revolutions of the wheel-and-tire assembly has been completed. Using the predetermined and fixed optimum camber angle does not compensate for real-time factors that influence the effective loading of the wheel-and-tire assembly and hence the damage experienced by the wheel-and-tire assembly such as: tire-to-drum friction; friction variation with temperature at the tire contact patch; wheel-and-tire geometry, size and stiffness; tire rubber formulation; tread design and wear; and tire debris within the rotating drum. These factors, as well as others, ultimately influence the position of the tire on the drum and its relative interaction therewith. The main effect of this fixed, optimum tilt or camber angle method is a random and unquantifiable source of variation in the test results and an inability to test with significant statistical correlation using different biaxial wheel testing apparatuses.

It is desirable, therefore, to provide an improved, compact, biaxial wheel test assembly that accurately measures loads experienced by a wheel-and-tire assembly and provides direct feedback to a control and data collection system. It is also desirable to provide a biaxial wheel test assembly that automatically and in real-time compensates for factors that influence the effective loading of a wheel-and-tire assembly and hence the damage experienced by the wheel-and-tire assembly.

SUMMARY OF THE INVENTION

According to one aspect of the invention, a wheel test assembly is provided for testing a wheel-and-tire assembly.

The test assembly includes a base and a cylindrical drum that is operatively mounted to the base and rotates about a first rotational axis. The drum includes an inner circumferential surface. A tailstock assembly is slidably coupled to the base for movement in a lateral direction relative to the drum. A support assembly is slidably coupled to the tailstock assembly for movement in a vertical direction for positioning the wheel-and-tire assembly into rolling contact with the inner circumferential surface of the drum. A spindle assembly is pivotally coupled to the support assembly for pivotal movement about a pivot axis to adjust a camber angle of the wheel-and-tire assembly. The pivot axis extends in a direction normal to the lateral direction and the vertical direction. The wheel-and-tire assembly is mounted to the spindle assembly for rotation of the wheel-and-tire assembly about a second rotational axis in response to rolling contact with the inner circumferential surface of the drum.

According to another aspect of the invention, a method of using a biaxial wheel test assembly to test a wheel-and-tire assembly includes the steps of rotating a drum at a predetermined speed; engaging the rotating drum with the wheel-and-tire assembly; applying axial and radial force set points to the wheel-and-tire assembly; monitoring a camber moment of the wheel-and-tire assembly with a wheel force transducer; and controlling a camber angle of the wheel-and-tire assembly in response to monitoring the camber moment.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
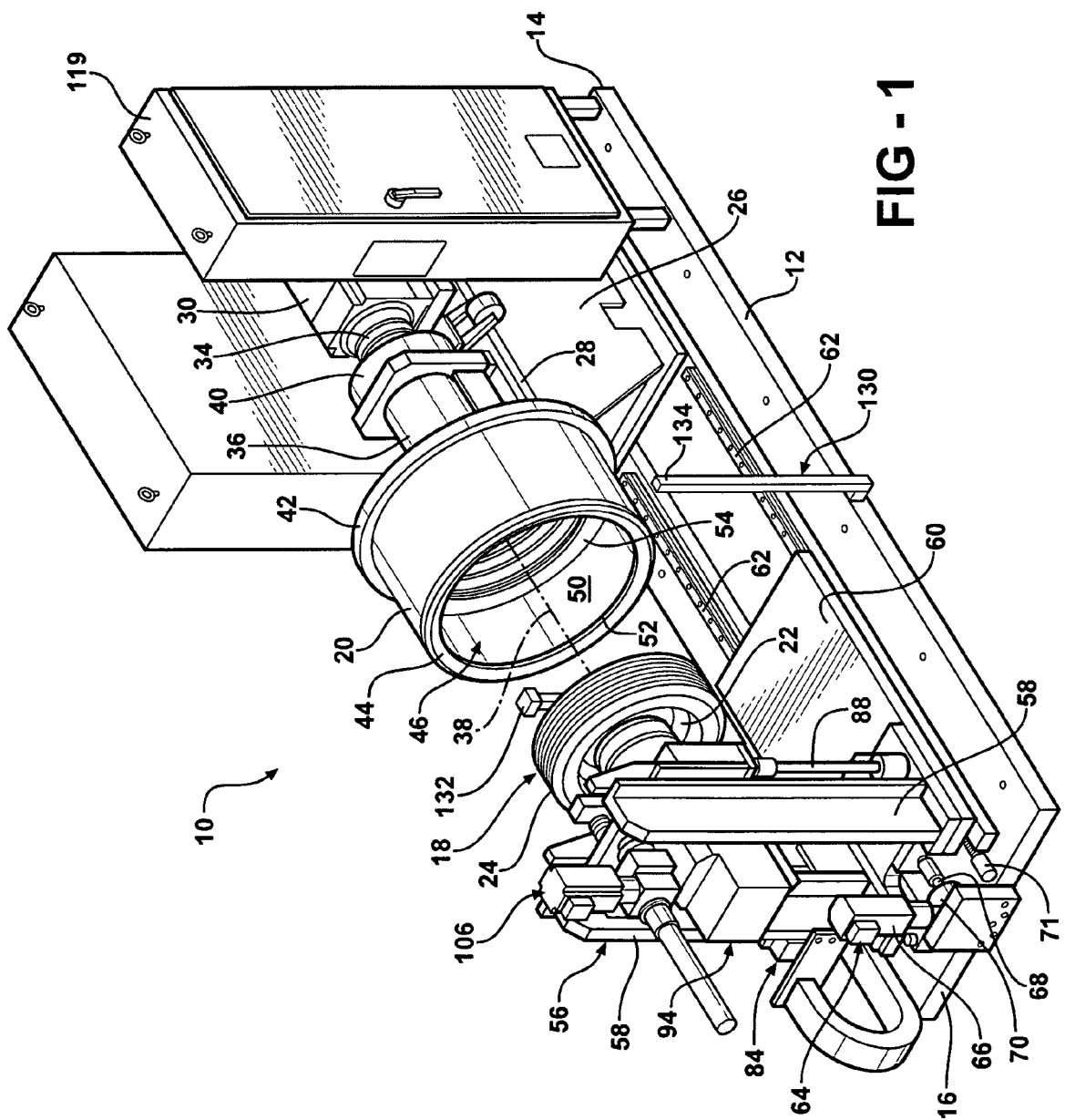
FIG. 1 is a perspective view of a biaxial wheel test assembly according to one embodiment of the invention.
Figure 2:
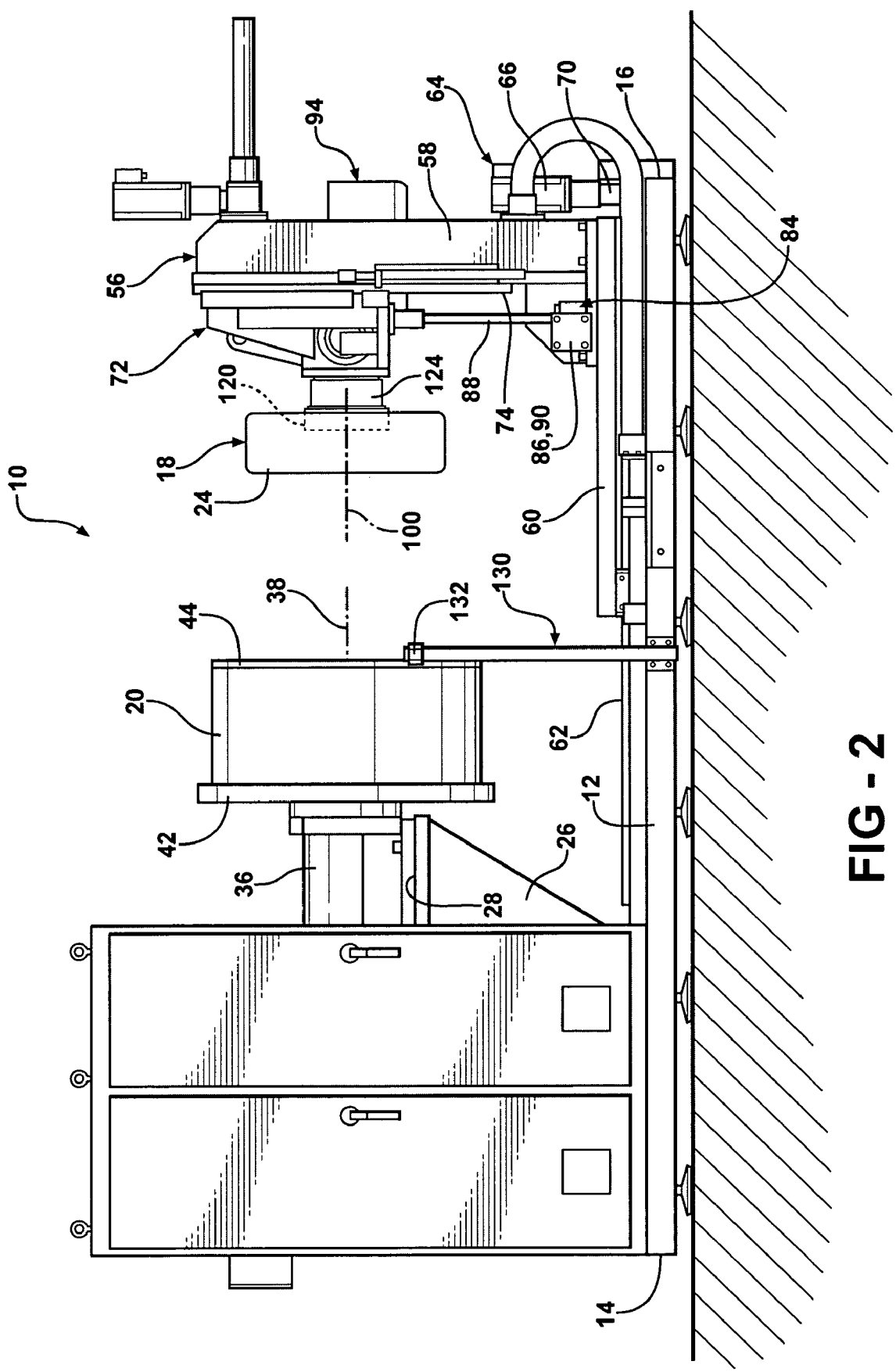
FIG. 2 is a side view of the biaxial wheel test assembly.

Referring to the Figures, FIGS. 1 and 2 disclose a biaxial wheel test assembly, generally shown at 10, that is provided for fatigue and durability testing of wheel components of a motor vehicle, such as, wheel rims, wheel hubs, wheel bearings, wheel bolts, and/or other braking, steering, and suspension components. The test assembly 10 is also provided for load versus strain mapping measurements of the above-listed wheel components. The test assembly 10 includes a primary base 12 or platform that extends between first 14 and second 16 ends and supports a wheel-and-tire assembly 18 in engagement with a rotating drum 20. The wheel-and-tire assembly 18 includes a wheel rim 22 with a tire 24 mounted to it.

A riser 26 is mounted to the first end 14 of the primary base 12 for rotatably supporting the drum 20 at a predetermined height above the primary base 12. The riser 26 includes an upper supporting surface 28 that is spaced apart from the primary base 12 in a vertical direction. An electric motor 30 is mounted to the upper supporting surface 28 of the riser 26 for providing rotational movement of an output shaft 34. The output shaft 34 is connected to and drives a spindle 36 which, in turn, drives or rotates the drum 20 about a first rotational axis 38 that is coincident to the cylinder axis. The first rotational axis 38 is substantially horizontal. An emergency disc brake 40 is mounted to the output shaft 34 and is disposed between the motor 30 and the spindle 36 to stop rotation of the drum 20 if required.

The drum 20 is generally cylindrical and extends between a first closed end 42 connected to the spindle 36 and a second open end 44. The drum 20 defines a large inner cavity 46 for receiving the wheel-and-tire assembly 18 therein. During testing, when the wheel-and-tire assembly 18 is disposed through the open end 44 of the drum 20 into the inner cavity 46, a portion of the tire 24, or tire contact patch, engages an inner circumferential surface 50 of the drum 20. As is known in the art, an edge of the inner circumferential surface 50 adjacent to the open end 44 includes an inner curb or ring 52 and an edge of the inner circumferential surface 50 adjacent the closed end 42 includes an outer curb or ring 54, the purpose of which is set forth below. The tire contact patch may also engage either the inner curb 52 or the outer curb 54 depending on the position of the wheel-and-tire assembly 18 within the drum 20.

Figure 7:
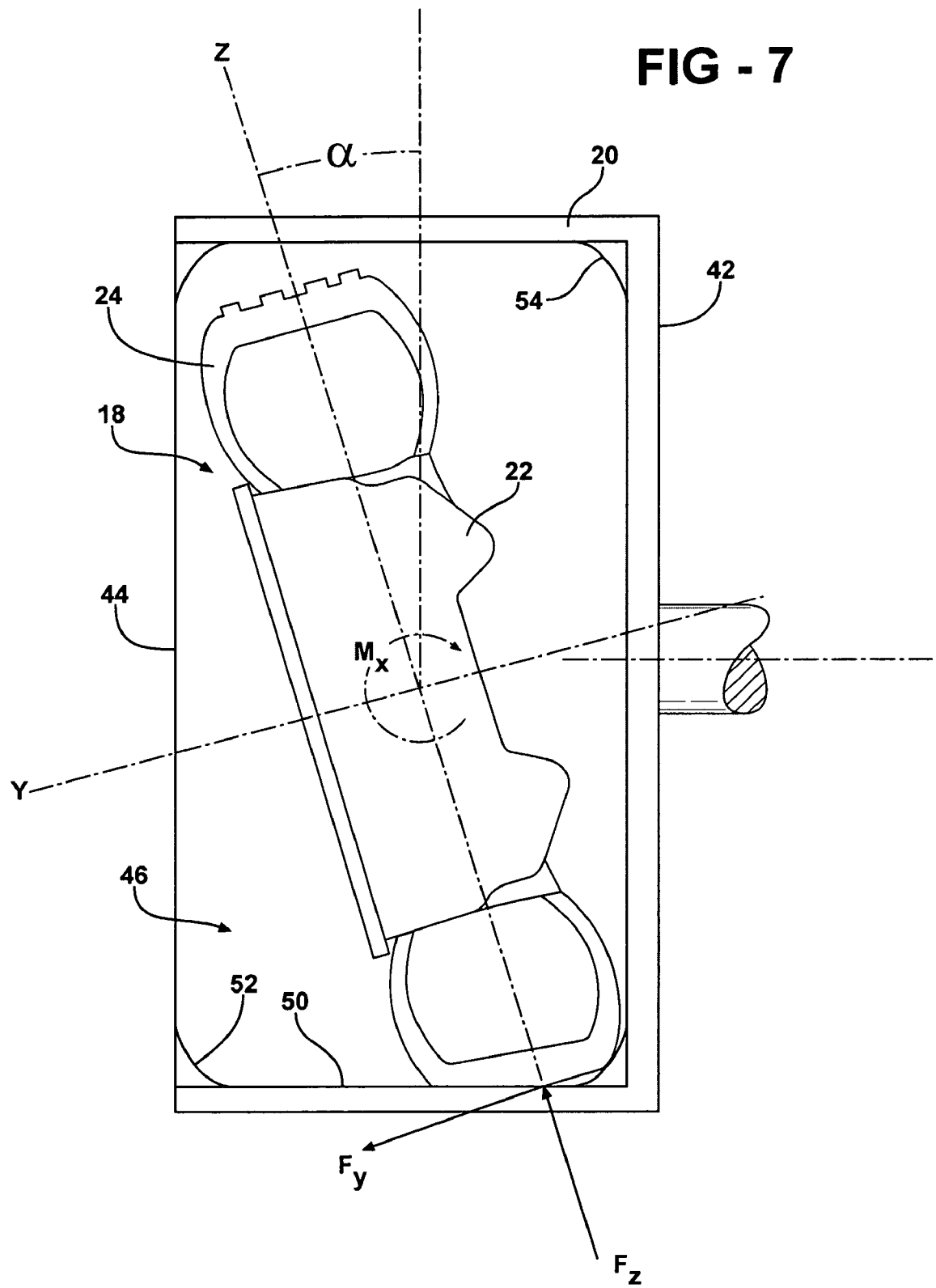
FIG. 7 is a cross-sectional view through a drum and a wheel-and-tire assembly.

At the second end 16 of the primary base 12 a tailstock assembly 56 is provided for rotatably supporting the wheel-and-tire assembly 18 and for manipulating the wheel-and-tire assembly 18 during testing. When the tire 24 is brought into engagement with the inner circumferential surface 50 of the drum 20, the forces or loads applied to or experienced by the wheel-and-tire assembly 18 include an axial force $F_y$, a radial force $F_z$ and a camber or overturning moment $M_x$. The axial force $F_y$, radial force $F_z$ and camber moment $M_x$ are measured in a coordinate system of the wheel-and-tire assembly 18, as is described below and shown in FIG. 7. The tailstock assembly 56 moves the wheel-and-tire assembly 18 along a lateral axis parallel to the first rotational axis 38 and normal to a longitudinal axis, which defines the vehicle moving path. The tailstock assembly 56 moves the wheel-and-tire assembly 18 along a vertical axis normal to both the lateral axis and the longitudinal axis.

The tailstock assembly 56 includes a frame having a pair of spaced apart upright members 58 fixedly secured to and extending upwardly from a secondary base 60. The secondary base 60 is slidably mounted to a first pair of linear guide rails 62 extending along the primary base 12 in a lateral direction parallel to the first rotational axis 38. The first guide rails 62 are fixedly secured to the primary base 12. The tailstock assembly 56 is moved along the first guide rails 62 toward and away from the drum 20 by a first actuator 64. The first actuator 64 includes a first servo drive 66 operatively coupled to a first ball screw 68 by a first gearbox 70 for rotation of the first ball screw 68. The first ball screw 68 in turn is operatively coupled to the secondary base 60 to convert rotational movement of the first ball screw 68 into linear movement of the tailstock assembly 56. The first ball screw 68 extends in the lateral direction and is disposed between the first guide rails 62 and below the secondary base 60. The first gearbox 70 is mounted to the second end 16 of the primary base 12. Rotation of the first ball screw 68 by the first servo drive 66 causes the tailstock assembly 56 to move along the first guide rails 62 toward and away from the drum 20. A lateral linear position transducer or other sensor 71, shown in FIG. 1, provided for determining the lateral position of the tailstock assembly 56 is disposed alongside one of the first guide rails 62 and is operatively coupled between the tailstock assembly 56 and the primary base 12.

The tailstock assembly 56 also includes a support assembly 72 slidably mounted to a second pair of linear guide rails 74 extending along the upright members 58 in the vertical direction. More specifically, referring to FIG. 3, the support assembly 72 includes a pair of frame members 76 having a cross-member 78 pivotally coupled therebetween, and each frame member 76 is slidably mounted to one of the second guide rails 74. A pair of camber load cells 80 is operatively mounted between the cross-member 78 and an actuator mounting plate 82. The purpose of the camber load cells 80 is described below in detail. Each one of the second guide rails 74 is fixedly secured along a front side of one of the upright members 58 in facing relation to the drum 20. The support assembly 72 is moved up and down along the second guide rails 74 by a second actuator 84, shown in FIGS. 1 and 2. The second actuator 84 includes a second servo drive 86 operatively coupled to a pair of second ball screws 88 by a second gearbox 90 for rotation of the second ball screws 88. Each one of the second ball screws 88 in turn is operatively coupled to one of the frame members 76 to convert rotational movement of the second ball screws 88 into linear movement of the support assembly 72. Each one of the second ball screws 88 is disposed adjacent one of the second guide rails 74 and extends in the vertical direction between the secondary base 60 and the corresponding frame member 76. The second gearbox 90 is mounted to the secondary base 60. A connecting shaft (not shown) extending between the second ball screws 88 enables the second servo drive 86 to drive both of the second ball screws 88 simultaneously. Rotation of the second ball screws 88 by the second servo drive 86 causes the support assembly 72 to move along the second guide rails 74 in the vertical direction. A vertical linear position transducer or other sensor 93, shown in FIG. 3, provided for detecting the vertical position of the support assembly 72 is disposed alongside one of the second guide rails 74 and is operatively coupled between the support assembly 72 and one of the upright members 58.

Figure 3:
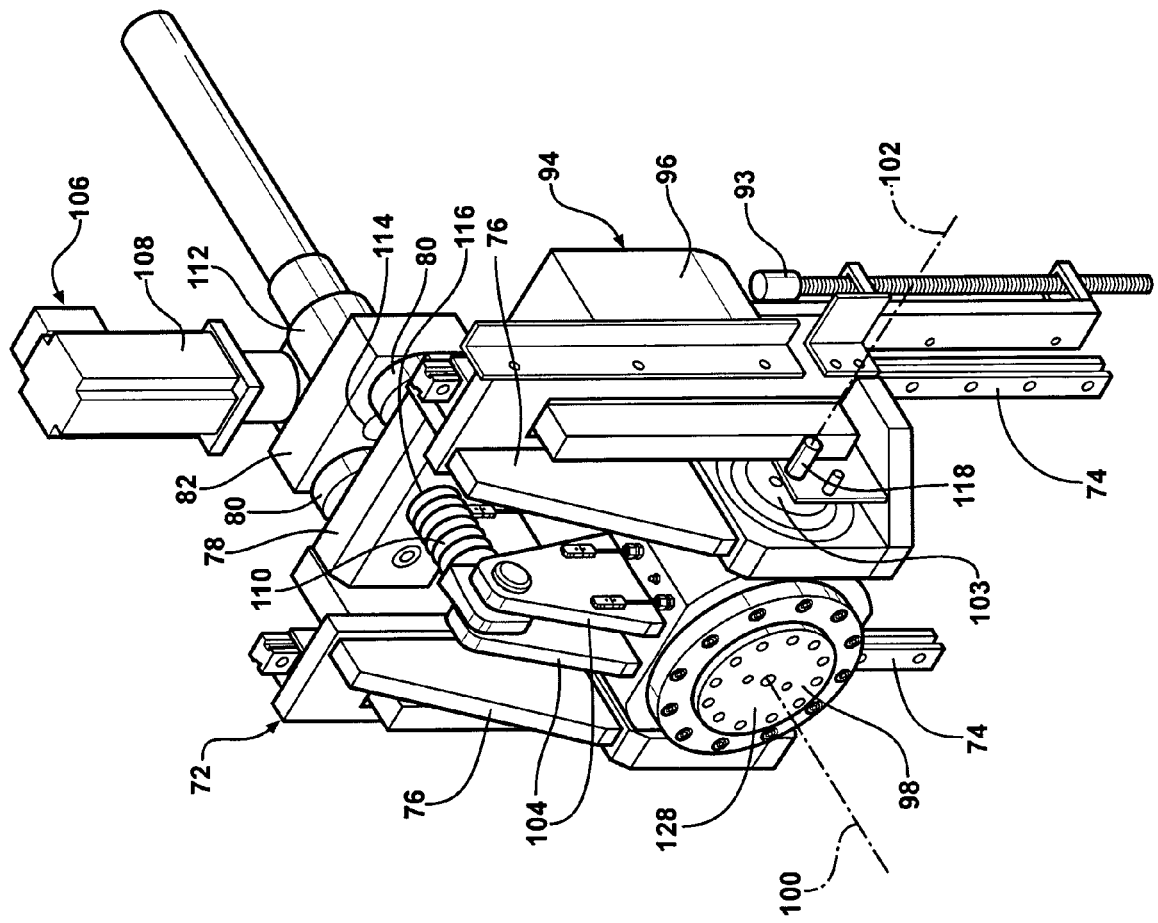
FIG. 3 is a fragmentary, perspective view of a tailstock assembly.
Figure 4:
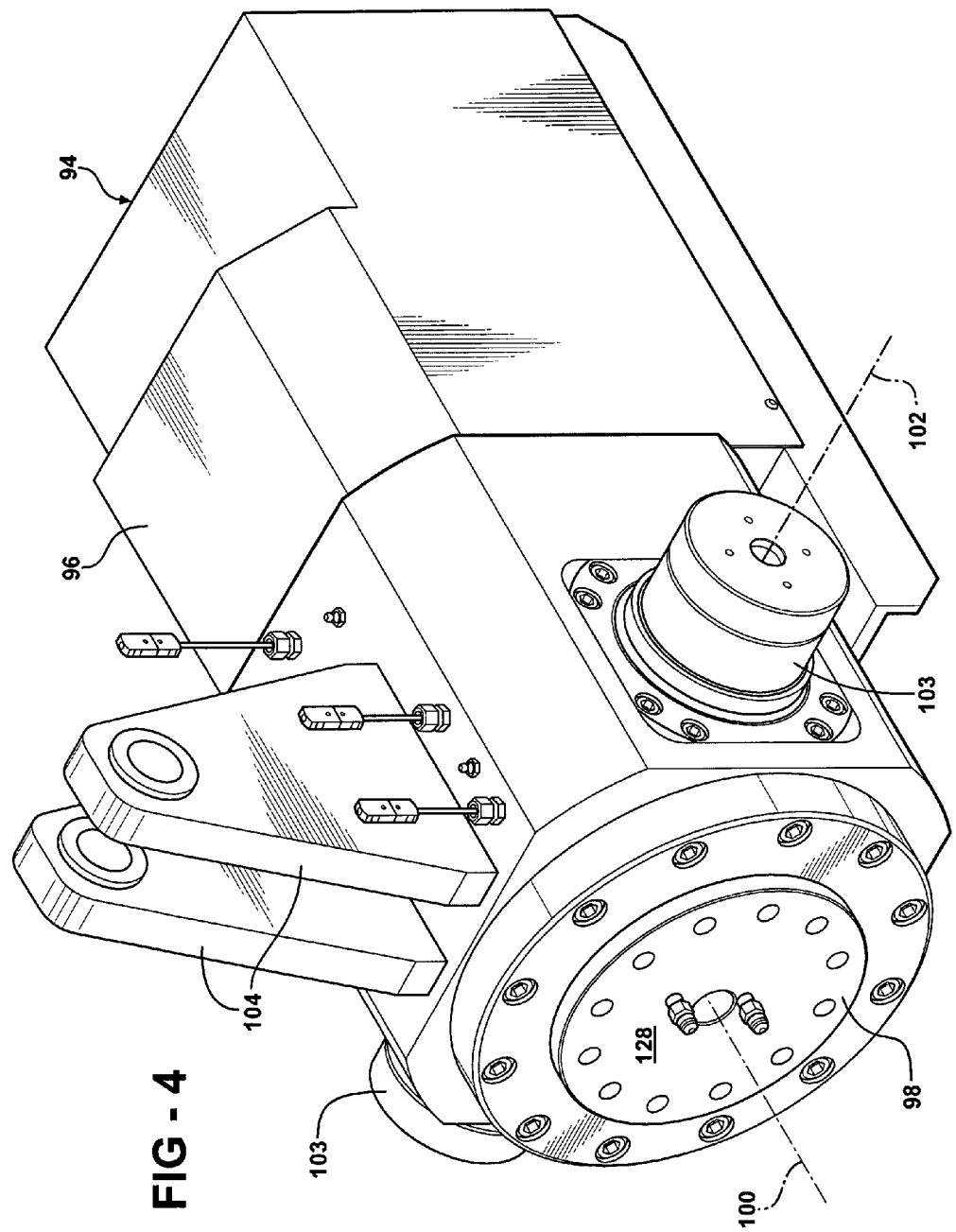
FIG. 4 is a perspective view of a spindle assembly.

Referring to FIGS. 3 and 4, the tailstock assembly 56 further includes a spindle assembly 94 that includes a spindle housing 96 and a spindle shaft 98 rotatably mounted within the spindle housing 96. The spindle assembly 94 allows the wheel-and-tire assembly 18 to rotate freely about a second rotational axis 100. The plane in which the second rotational axis 100 extends is the same as the plane in which the first rotational axis 38 extends, however, the first 38 and second 100 rotational axes themselves are not always parallel when the spindle assembly 94 is pivoted, as is described below. The wheel-and-tire assembly 18 is rotated when the tire 24 engages the inner circumferential surface 50 of the rotating drum 20. In other words, the motor 30 drives the drum 20 and the drum 20 drives the wheel-and-tire assembly 18.

The spindle assembly 94 also provides pivotal movement of the wheel-and-tire assembly 18 about a pivot axis 102 that is normal to both the second rotational axis 100 and the vertical axis. The pivot axis 102 is parallel to the longitudinal axis. The spindle assembly 94 is disposed between the frame members 76 of the support assembly 72 and includes a pair of pivot shafts 103 extending outwardly from the spindle housing 96. Each pivot shaft 103 is pivotally coupled to one of the frame members 76 thereby allowing pivotal movement of the spindle assembly 94 about the pivot axis 102. The spindle assembly 94 also includes a pair of arms 104 fixedly secured to the spindle housing 96 that extend upwardly therefrom. The spindle housing 96 is pivoted about the pivot axis 102 by a third actuator 106. The third actuator 106 includes a third servo drive 108 operatively coupled to a third ball screw 110 by a third gearbox 112 for rotation of the third ball screw 110. The third ball screw 110 in turn is operatively coupled to the actuator mounting plate 82 to convert rotational movement of the third ball screw 110 into linear movement of the third ball screw 110 relative to the support assembly 72. The third ball screw 110 extends in the lateral direction through a first aperture 114 in the actuator mounting plate 82, between the camber load cells 80, through a second aperture 116 in the cross-member 78, and is pivotally coupled at one end to the arms 104 of the spindle assembly 94. The third gearbox 112 is mounted to the actuator mounting plate 82. Rotation of the third ball screw 110 by the third servo drive 108 causes linear movement of the third ball screw 110 and pivots the spindle assembly 94 about the pivot axis 102, which varies a tilt or camber angle $\alpha$ of the wheel-and-tire assembly 18. The camber angle $\alpha$ is defined as the angle between a Z-axis of the coordinate system of the wheel-and-tire assembly 18 and the vertical axis. A rotary position transducer or other sensor 118 is provided for detecting the pivotal position of the spindle assembly 94. The rotary position transducer 118 is disposed alongside one of the frame members 76 and is operatively coupled between the frame member 76 and the respective pivot shaft 103. The pivotal position of the spindle assembly 94 corresponds to the camber angle $\alpha$ of the wheel-and-tire assembly 18.

The test assembly 10 includes a computerized control unit 119 that runs or executes a control algorithm to control the rotation of the drum 20 and determines loading, position, and camber angle conditions for the wheel-and-tire assembly 18 during testing. The computerized control unit 119 also stores test data and allows for operator interaction. For example, an operator can enter identifying data for the wheel-and-tire assembly 18 to be tested. The first actuator 64 is operated to move the wheel-and-tire assembly 18 laterally into the inner cavity 46 of the drum 20. The second actuator 84 is then operated to move the wheel-and-tire assembly 18 vertically to engage the tire 24 with the inner circumferential surface 50 of the drum 20, thereby causing the wheel-and-tire assembly 18 to rotate in response to rotation of the drum 20. Next, the first, second, and third actuators 64, 84, 106 are operated to apply an axial force $F_y$ and a radial force $F_z$ with a corresponding camber moment $M_x$ to the wheel-and-tire assembly 18. The first actuator 64 is operated to apply and control the axial force $F_y$ and the second actuator 84 is operated to apply and control the radial force $F_z$. The axial force $F_y$ may be positive or negative depending on whether the first actuator 64 pushes the tire 24 against the outer curb 54 of the drum 20 or pulls the tire 24 against the inner curb 52 of the drum 20. Additionally, the third actuator 106 is operated to control the camber angle $\alpha$ of the wheel-and-tire assembly 18 thereby changing the respective axial and radial forces $F_y$, $F_z$, which also changes the resultant camber moment $M_x$. It is appreciated that the first, second, and third actuators 64, 84, 106 may all be operated simultaneously in order to obtain any desired combination of axial and radial forces $F_y$, $F_z$ and any desired camber moment $M_x$. The axial and radial forces $F_y$, $F_z$, applied to the wheel-and-tire assembly 18 correspond to a load pair or a series of load pairs that are predetermined from vehicle testing, as is conventional in the art. Each load pair includes an axial force set point $F_{y\_sp}$ and a radial force set point $F_{z\_sp}$ with a corresponding camber moment set point $M_{x\_sp}$. The series of load pairs is a first input of the control algorithm.

Figure 5:
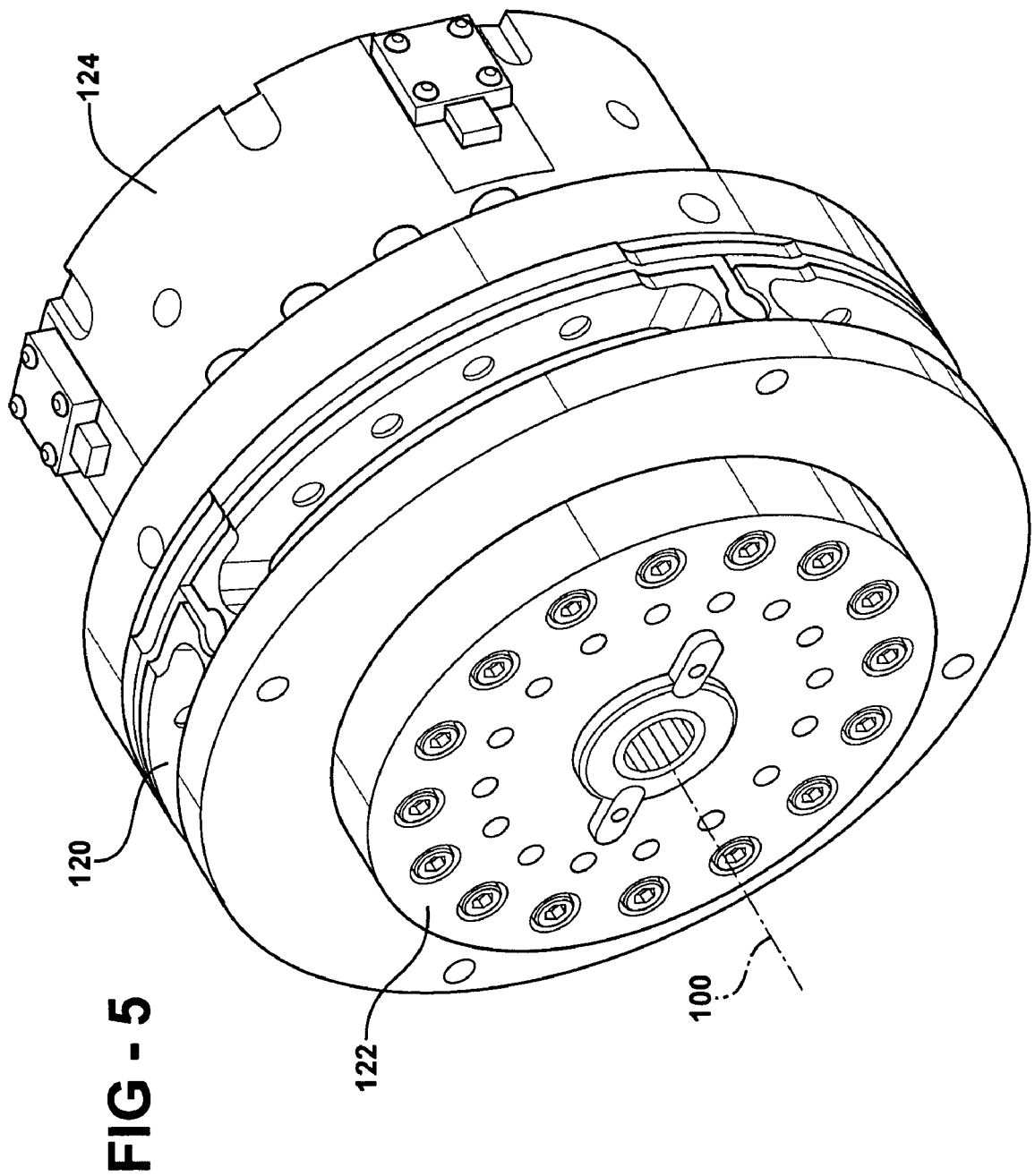
FIG. 5 is a perspective view of a wheel force transducer sandwiched between a wheel hub adapter and a spindle shaft adapter.
Figure 6:
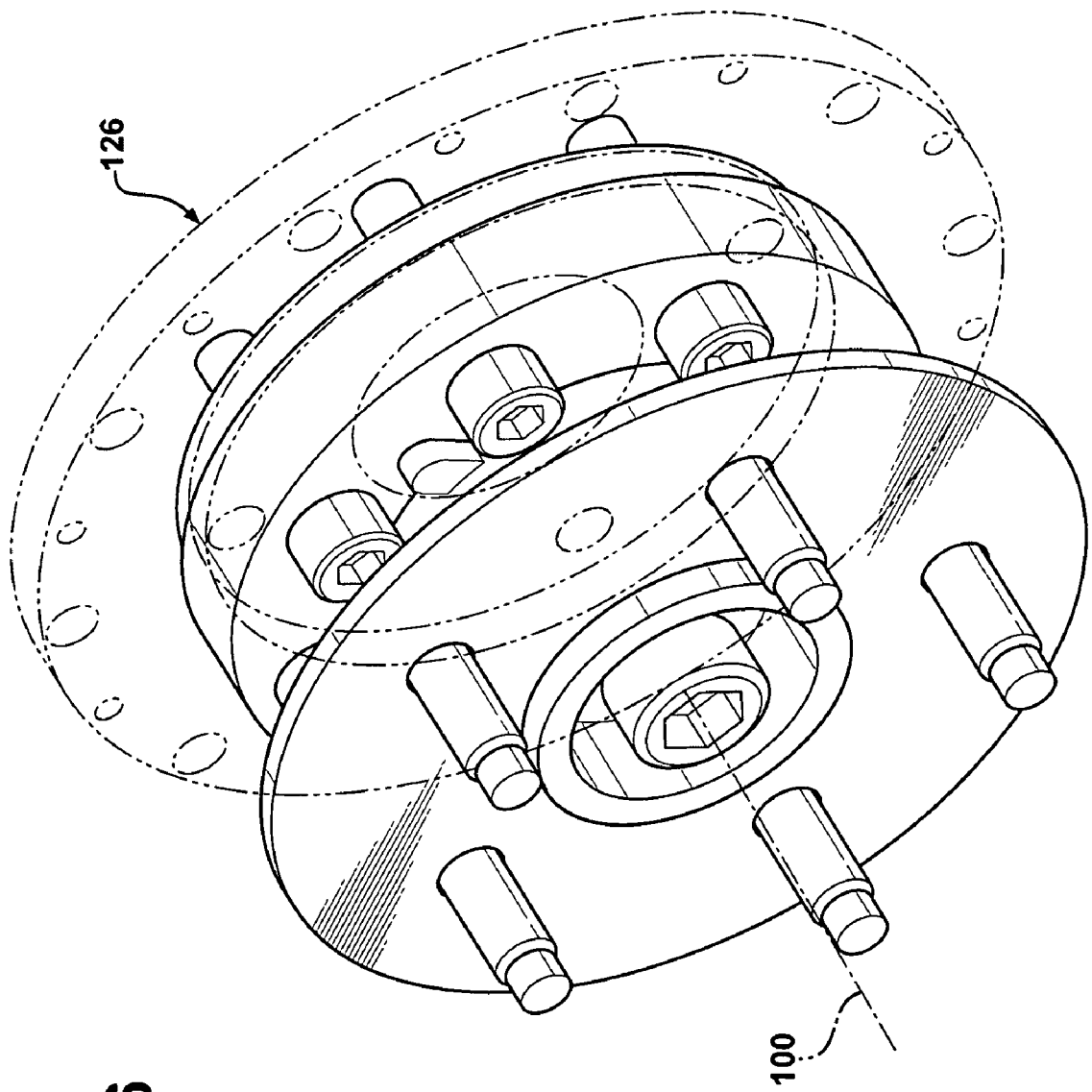
FIG. 6 is a perspective view of a wheel hub assembly.

In order to measure the axial and radial forces $F_y$, $F_z$ and camber moment $M_x$ experienced by the wheel-and-tire assembly 18 during testing with the test assembly 10, a wheel force transducer 120 is provided. The wheel force transducer 120 is disposed between the wheel-and-tire assembly 18 and the spindle assembly 94. More specifically, the wheel force transducer 120 is sandwiched between a wheel hub adapter 122 and a spindle shaft adapter 124, as shown in FIG. 5. The wheel rim 22 is mounted to a wheel hub assembly 126, shown in FIG. 6, which is mounted to the wheel hub adapter 122. The spindle shaft adapter 124 in turn is mounted to a mounting face 128 of the spindle shaft 98. The wheel force transducer 120 is a multi-axis wheel load transducer such as that disclosed in U.S. Pat. No. 6,324,919, however, it is appreciated that the invention is not limited to any particular wheel force transducer. It is also appreciated that because the wheel-and-tire assembly 18 is mounted directly adjacent the wheel force transducer 120 the axial and radial forces $F_y$, $F_z$ measured by the wheel force transducer 120 are the actual forces experienced by the wheel-and-tire assembly 18 and the camber moment $M_x$ measured by the wheel force transducer 120 is the actual overturning moment experienced by the wheel-and-tire assembly 18. The wheel force transducer 120 measures the axial and radial forces $F_y$, $F_z$ that are applied by the test assembly 10 to the wheel-and-tire assembly 18 at the tire contact patch. The axial force $F_y$ extends in the direction of a Y-axis of the coordinate system of the wheel-and-tire assembly 18. The radial force $F_z$ extends along the Z-axis of the coordinate system of the wheel-and-tire assembly 18. The resultant combination of the axial and radial forces $F_y$, $F_z$ produces the camber moment $M_x$ about an X-axis of the coordinate system of the wheel-and-tire assembly 18. The camber load cells 80 are provided as a redundant or back-up system to verify the wheel force transducer 120 is working properly. Forces measured by the camber load cells 80 are mathematically correlated to the axial and radial forces $F_y$, $F_z$ measured by the wheel force transducer 120 during testing and any significant difference may be used as a warning alert.

Referring to FIGS. 1 and 2, a photo beam sensor assembly 130 is disposed adjacent the open end 44 of the drum 20 for verifying the lateral position of the wheel-and-tire assembly 18 and cooperating with the lateral linear position transducer 71 to determine the width of the tire 24. The sensor assembly 130 includes a sending/receiving unit 132 for sending and receiving a signal beam and a reflector 134 for reflecting the signal beam back to the sending/receiving unit 132, as is well known in the art. It is appreciated that any suitable sensor assembly can be used without varying from the scope of the invention. In operation, as the tailstock assembly 56 is moved along the first guide rails 62 laterally toward the drum 20, the sensor assembly 130 detects the wheel-and-tire assembly 18 as the tire 24 breaks the path of the signal beam. At the same time, the lateral linear position transducer 71 measures the lateral movement or travel of the tailstock assembly 56 and when the tire 24 no longer breaks the path of the signal beam the amount of lateral travel corresponds to the width of the tire 24. The lateral position of the wheel-and-tire assembly 18 and the width of the tire 24 is used to prevent a crash between the wheel-and-tire assembly 18 and the drum 20 during testing. Similarly, the vertical linear position transducer 93 is used to determine the diameter of the wheel-and-tire assembly 18 by measuring the vertical movement or travel of the support assembly 72 along the second guide rails 74 as the wheel-and-tire assembly 18 is lowered until the tire 24 engages the inner circumferential surface 50 of the drum 20 and begins to rotate in response to rotation of the drum 20. This sequence of measurements is compared with the identifying data previously entered into the control unit 119 and ensures that the actual wheel-and-tire assembly 18 mounted on the spindle assembly 94 corresponds to the intended wheel-and-tire assembly 18 identified in the control algorithm.

Prior to testing the wheel-and-tire assembly 18 with the test assembly 10, the lateral linear position transducer 71, camber load cells 80, vertical linear position transducer 93, wheel force transducer 120, and rotary position transducer 118 are all reset to ensure the accuracy of readings made during the testing. More specifically, after mounting the wheel-and-tire assembly 18 to the wheel hub assembly 126, the control unit 119 will zero and calibrate each of the lateral linear position transducer 71, camber load cells 80, vertical linear position transducer 93, wheel force transducer 120, and rotary position transducer 118.

Variation in the test results during testing of the wheel-and-tire assembly 18 with the test assembly 10 is typically due to factors including: tire-to-drum friction; friction variation with temperature at the tire contact patch; wheel-and-tire geometry, size and stiffness; tire rubber formulation; tread design and wear; and tire debris within the drum 20. In order to minimize variation in the test results, the control algorithm automatically and in real-time controls the camber angle α of the wheel-and-tire assembly 18 in response to monitoring the camber moment $M_x$. To optimize the camber angle α in real-time, a moment radius $R_{mom}$ of the tire 24 is first determined. During vehicle testing or flat track testing, the tire 24 makes a flat contact patch with the road or flat track surface which corresponds to a dynamic rolling radius. The dynamic rolling radius is the average rotating point of friction between the tire 24 and the road or flat track surface. However, during testing of the wheel-and-tire assembly 18 with the test assembly 10, the drum 20 wraps around the tire 24. Because the tire contact patch is not a single point, the camber moment $M_x$ measured by the wheel force transducer 120 is a result of the sum of an infinite number of tread side force vectors wrapping around the tire 24 and farther up the sides past the contact area because the tread is stiff in the tread side load direction. This effectively reduces the moment radius $R_{mom}$ of the tire 24 to considerably less than the dynamic rolling radius. To determine the moment radius $R_{mom}$, the wheel-and-tire assembly 18 is oriented within the drum 20 at a camber angle α of zero (0) degrees, a known radial force is applied to the wheel-and-tire assembly 18, and then the tire 24 is dragged laterally back and forth across the inner circumferential surface 50 of the drum 20 while the drum 20 is stationary. The wheel force transducer 120 measures a dragging camber moment $M_{x\_drag}$ and a dragging axial force $F_{y\_drag}$. The moment radius $R_{mom}$ is calculated using the equation:

$$R_{mom} = M_{x\_drag} / F_{y\_drag}$$

This process of dragging the tire 24 laterally back and forth across the inner circumferential surface 50 of the drum 20 is performed for a range of radial loads from the series of load pairs that are predetermined during vehicle testing. Thus, the moment radius $R_{mom}$ is an average of several calculated values. For example, the moment radius $R_{mom}$ may be the average of four radiuses calculated by dragging the tire 24 back and forth across the inner circumferential surface 50 of the drum 20 at the following radial forces: $0.8F_{z\_max}$; $0.6F_{z\_max}$; $0.4F_{z\_max}$; and $0.2F_{z\_max}$, where $F_{z\_max}$ is a maximum radial force from the series of load pairs. The moment radius $R_{mom}$ is then stored as a second input of the control algorithm and is used for controlling the camber angle α in real-time during testing of the wheel-and-tire assembly 18.

For each load pair in the series of load pairs a starting camber angle is determined prior to testing the wheel-and-tire assembly 18. To determine the starting camber angle for each load pair, the wheel-and-tire assembly 18 is positioned within the drum 20 at a camber angle α of zero (0) degrees with the tire 24 engaged with the inner circumferential surface 50 of the drum 20. The drum 20 is rotated at a low speed, for example one hundred and twenty (120) revolutions per minute, and the first and second actuators 64, 84 are operated to apply the axial and radial loads $F_y$, $F_z$ to the wheel-and-tire assembly 18 which equal the axial and radial load set points $F_{y\_sp}$, $F_{z\_sp}$ of the selected load pair. The third actuator 106 is operated to adjust the camber angle α while monitoring the camber moment $M_x$ in real-time using the wheel force transducer 120. The camber moment $M_x$ is used to calculate an axial-force-via moment $F_{y\_mom}$ using the equation:

$$F_{y\_mom} = M_x/R_{mom}$$

The camber angle α is adjusted until the axial-force-via moment $F_{y\_mom}$ equals the axial force set point $F_{y\_sp}$ of the selected load pair. The control unit 119 then stores the camber angle α as the starting camber angle for the selected load pair. This process is repeated for each load pair in the series of load pairs to create a test script. The test script is a third input of the control algorithm.

Each test script contains unique wheel test data from a particular vehicle platform and it is contemplated that the test script can be used for each wheel-and-tire assembly 18 that is to be tested for use on that particular vehicle platform. The test script consists of a series of lines or blocks of data. Each block contains the following data: (1) axial force set point $F_{y\_sp}$; (2) radial force set point $F_{z\_sp}$; (3) starting camber angle; (4) drum rotational speed $S_d$; and (5) number of wheel revolutions in this block $N_w$. During testing, the control algorithm accesses the test script and executes each block in sequence until the last block is completed. At the start of each block, the wheel-and-tire assembly 18 is positioned in the drum 20 at the starting camber angle, the drum 20 is brought to the specified drum rotational speed $S_d$, and a wheel revolution counter for that block is set to zero. As the wheel-and-tire assembly 18 is rotated by rotation of the drum 20, the test assembly 10 automatically and in real-time controls the first, second, and third actuators 64, 84, 106 to simultaneously maintain: (1) the axial force $F_y$ as measured at the wheel force transducer 120 generally equal to the axial force set point $F_{y\_sp}$; (2) the axial-force-via-moment $F_{y\_mom}$ (calculated from the moment radius $R_{mom}$ and the camber moment $M_x$ measured at the wheel force transducer 120) generally equal to the axial force set point $F_{y\_sp}$; and (3) the radial force $F_z$ as measured at the wheel force transducer 120 generally equal to the radial force set point $F_{z\_sp}$. In other words, the test assembly 10 automatically and in real-time controls the camber angle α in response to measuring the camber moment $M_x$ such that the axial-force-via-moment $F_{y\_mom}$ is generally equal to the axial force set point $F_{y\_sp}$ and simultaneously controls the axial and radial forces $F_y$, $F_z$ to be generally equal to the axial and radial force set points $F_{y\_sp}$, $F_{z\_sp}$. Thus, it is appreciated that the first, second and third actuators 64, 84, 106 are continuously operated during testing of the wheel-and-tire assembly 18. Between blocks with significantly different camber angles α, the second actuator 84 is operated to reduce the radial force $F_z$ applied to the wheel-and-tire assembly 18 to minimize uncontrolled damage to the wheel 22 during the transition to the next load pair in the test script.

A method of using the biaxial wheel test assembly 10 to test the wheel-and-tire assembly 18 includes the steps of: mounting the wheel-and-tire assembly 18 to the test assembly 10; selecting the test script to be input into the control algorithm; entering identifying data for the wheel-and-tire assembly 18; zeroing and calibrating the lateral linear position transducer 71, camber load cells 80, vertical linear position transducer 93, wheel force transducer 120, and rotary position transducer 118; positioning the wheel-and-tire assembly 18 in the drum 20 at the starting camber angle to engage the tire 24 with the inner circumferential surface 50 of the drum 20; rotating the drum 20 at the specified drum rotational speed $S_d$; and running the control algorithm to access the test script to test the wheel-and-tire assembly 18.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A wheel test assembly for testing a wheel-and-tire assembly, said wheel test assembly comprising:
a base;
a cylindrical drum operatively mounted to said base, said drum including an inner circumferential surface defining a first rotational axis, said drum rotatable about said first rotational axis;
a tailstock assembly slidably coupled to said base, said tailstock assembly slidable in a lateral direction relative to said drum;
a support assembly slidably coupled to said tailstock assembly, said support assembly slidable in a vertical direction for positioning the wheel-and-tire assembly into rolling contact with said inner circumferential surface of said drum; and
a spindle assembly pivotally coupled to said support assembly, said spindle assembly pivotal about a pivot axis to adjust a camber angle of the wheel-and-tire assembly, said pivot axis extending in a direction normal to said lateral direction and normal to said vertical direction, the wheel-and-tire assembly rotatably mounted to said spindle, the wheel-and-tire assembly rotatable about a second rotational axis in response to rolling contact with said inner circumferential surface of said drum.

2. A wheel test assembly as set forth in claim 1 wherein moving said tailstock assembly in said lateral direction with the wheel-and-tire assembly in rolling contact with said inner circumferential surface of said drum applies an axial force to the wheel-and-tire assembly, wherein moving said support assembly in said vertical direction with the wheel-and-tire assembly in rolling contact with said circumferential surface of said drum applies a radial force to the wheel-and-tire assembly, and wherein said axial and radial forces apply a camber moment to the wheel-and-tire assembly about a longitudinal axis, said longitudinal axis parallel to said pivot axis of said spindle assembly.

3. A wheel test assembly as set forth in claim 2 further including a multi-axis force transducer disposed between the wheel-and-tire assembly and said spindle assembly to measure said axial and radial forces and said camber moment.

4. A wheel test assembly as set forth in claim 3 further including a first actuator operatively coupled between said base and said tailstock assembly moving said tailstock assembly in said lateral direction, a second actuator operatively coupled between said tailstock assembly and said support assembly moving said support assembly in said vertical direction, and a third actuator operatively coupled between said support assembly and said spindle assembly pivoting said spindle assembly about said pivot axis.

5. A wheel test assembly as set forth in claim 4 wherein said first actuator includes a first servo drive mounted to said base and a first ball screw operatively coupled to said base and said tailstock assembly wherein said first servo drive rotates said first ball screw to move said tailstock assembly in said lateral direction, said second actuator includes a second servo drive mounted to said tailstock assembly and a second ball screw operatively coupled to said tailstock assembly and said support assembly wherein said second servo drive rotates said second ball screw to move said support assembly in said vertical direction, and said third actuator includes a third servo drive mounted to said support assembly and a third ball screw operatively coupled to said support assembly and said spindle assembly wherein said third servo drive rotates said third ball screw to pivot said spindle assembly about said pivot axis.

6. A wheel test assembly as set forth in claim 5 wherein said tailstock assembly includes a pair of spaced apart upright members, said support assembly includes a pair of spaced apart frame members slidably coupled to said pair of spaced apart upright members, and said spindle assembly is disposed between and pivotally coupled to said pair of spaced apart frame members to pivot said spindle assembly about said pivot axis.

7. A wheel test assembly as set forth in claim 6 wherein one end of said third ball screw is pivotally coupled to said spindle assembly and said third ball screw is operatively coupled to said support assembly, and wherein rotation of said third ball screw results in linear movement of said third ball screw relative to said support assembly thereby pivoting said spindle assembly about said pivot axis.

8. A wheel test assembly as set forth in claim 7 wherein said support assembly includes a cross-member and at least one load cell, said cross-member pivotally coupled between said pair of spaced apart frame members, said at least one load cell disposed between said cross-member and said third actuator to measure a camber force, said third ball screw extending through said cross-member, wherein said camber force measured with said at least one load cell is mathematically correlated with said axial and radial forces measured with said wheel force transducer to ensure said wheel force transducer is functioning properly.

9. A method of testing a wheel-and-tire assembly using a biaxial wheel test assembly, the test assembly including a drum and a wheel force transducer, the method comprising the steps of:
    rotating the drum at a first predetermined speed;
    engaging the rotating drum with the wheel-and-tire assembly;
    applying a radial force to the wheel-and-tire assembly measured with the wheel force transducer generally equal to a radial force set point;
    applying an axial force set point to the wheel-and-tire assembly measured with the wheel force transducer generally equal to an axial force set point;
    measuring a camber moment of the wheel-and-tire assembly with the wheel force transducer; and
    controlling a camber angle of the wheel-and-tire assembly in response to measuring the camber moment.

10. A method as set forth in claim 9 wherein the step of controlling the camber angle includes adjusting the camber angle to minimize the difference between an axial-force-via-moment calculated from the camber moment and the axial force set point.

11. A method as set forth in claim 10 wherein the axial-force-via-moment is calculated by means of the equation $F_{y\_mom}=M_x/R_{mom}$ wherein $M_x$ is the camber moment and $R_{mom}$ is a moment radius.

12. A method as set forth in claim 11 including maintaining simultaneously the radial force generally equal to the radial force set point, the axial force generally equal to the axial force set point, and the axial-force-via-moment generally equal to the axial force set point.

13. A method as set forth in claim 12 including determining a moment radius prior to the step of rotating the drum, wherein determining the moment radius includes the steps of:
    engaging the drum with the wheel-and-tire assembly with the camber angle at approximately zero degrees;
    applying a predetermined radial force to the wheel-and-tire assembly;
    dragging the wheel-and-tire assembly laterally back and forth with the wheel-and-tire assembly engaging the drum;
    measuring a dragging axial force and a dragging camber moment of the wheel-and-tire assembly with the wheel force transducer; and
    calculating the moment radius by means of the equation $R_{mom}=M_{x\_drag}/F_{y\_drag}$ wherein $M_{x\_drag}$ is the dragging camber moment and $F_{y\_drag}$ is the dragging axial force.

14. A method as set forth in claim 13 including adjusting the camber angle of the wheel-and-tire assembly to a starting camber angle before the step of applying the radial force to the wheel-and-tire assembly.

15. A method as set forth in claim 14 including the step of determining the starting camber angle after the step of determining the moment radius and before the step of rotating the drum at the first predetermined speed.

16. A method as set forth in claim 15 wherein determining the starting camber angle includes the steps of:
    rotating the drum at a second predetermined speed;
    engaging the rotating drum with the wheel-and-tire assembly with the camber angle at approximately zero degrees;
    applying the radial force to the wheel-and-tire assembly measured with the wheel force transducer generally equal to the radial force set point;
    applying the axial force to the wheel-and-tire assembly measured with the wheel force transducer generally equal to the axial force set point;
    measuring the camber moment of the wheel-and-tire assembly with the wheel force transducer; and
    adjusting the camber angle until the axial-force-via-moment calculated from the measured camber moment is generally equal to the axial force set point.

17. A method of controlling a biaxial wheel test assembly for simulating driving loads, the test assembly including first, second and third actuators for controlling an axial force, a radial force, and a camber angle of a wheel-and-tire assembly to be tested, the test assembly further including a rotating drum with inner and outer rings and a wheel force transducer, the wheel-and-tire assembly being urged against the rotating drum and the inner and outer rings with the first, second and third actuators, the method comprising the steps of:
    adjusting the radial force based on a radial force set point previously determined during vehicle testing;
    adjusting the axial force based on an axial force set point previously determined during vehicle testing;
    measuring a camber moment based on the axial force and the radial force; and
    adjusting the camber angle based on the measured camber moment.

18. A method as set forth in claim 17 including continuously adjusting the axial and radial forces based on the axial and radial force set points in response to adjusting the camber angle.

19. A method of testing a wheel-and-tire assembly using a biaxial wheel test assembly, the test assembly including a drum and a wheel force transducer, the method comprising the steps of:

rotating the drum at a first predetermined speed;

engaging the rotating drum with the wheel-and-tire assembly;

applying a predetermined camber angle to the wheel-and-tire assembly;

applying a radial force to the wheel-and-tire assembly measured with the wheel force transducer generally equal to a radial force set point;

applying an axial force to the wheel-and-tire assembly measured with the wheel force transducer generally equal to an axial force set point; and maintaining simultaneously the axial force generally equal to the axial force set point, the radial force generally equal to the radial force set point, and an axial-force-via-moment generally equal to the axial force set point.

20. A method as set forth in claim 19 including the step of measuring a camber moment with the wheel force transducer.

21. A method as set forth in claim 20 wherein the axial-force-via-moment is calculated by means of the equation $F_{y\_mom} = M_x / R_{mom}$ wherein $M_x$ is the camber moment and $R_{mom}$ is a predetermined moment radius.

* * * * *